United States Patent [19]

Duba et al.

[11] Patent Number: 5,251,589
[45] Date of Patent: Oct. 12, 1993

[54] HOT TIP GLOW PLUG AND METHOD FOR MAKING

[75] Inventors: David E. Duba; Steven W. Fair, both of Shelbyville, Ind.

[73] Assignee: Wellman Automotive Products, Inc., Shelbyville, Ind.

[21] Appl. No.: 851,516

[22] Filed: Mar. 16, 1992

[51] Int. Cl.$^5$ .............. F02P 19/00; F02Q 7/00
[52] U.S. Cl. ................ 123/145 A; 219/270
[58] Field of Search ........... 123/145 A; 219/270

[56] References Cited

U.S. PATENT DOCUMENTS

| | | | |
|---|---|---|---|
| 2,884,920 | 5/1959 | Moule et al. | 123/145 A |
| 2,898,571 | 8/1959 | Moule et al. | 123/145 A |
| 3,107,658 | 10/1963 | Meurer | 123/276 |
| 3,158,787 | 11/1964 | Testerini | 123/145 A |
| 4,200,077 | 4/1980 | Kauhl et al. | 123/145 A |
| 4,211,204 | 7/1980 | Glauner et al. | 123/145 A |
| 4,281,451 | 8/1981 | Mann | 29/611 |
| 4,423,309 | 12/1983 | Murphy et al. | 219/270 |
| 4,477,717 | 10/1984 | Walton | 219/267 |
| 4,556,781 | 12/1985 | Bauer | 219/270 |
| 4,592,134 | 6/1986 | Walton | 29/611 |
| 4,733,053 | 3/1988 | Mueller | 123/145 A |
| 5,118,921 | 6/1992 | Aota | 123/145 A |
| 5,132,516 | 7/1992 | Hatanaka et al. | 123/145 A |

FOREIGN PATENT DOCUMENTS

| | | | |
|---|---|---|---|
| 0413147 | 2/1991 | European Pat. Off. | 219/270 |
| 1081720 | 5/1960 | Fed. Rep. of Germany | 219/270 |
| 3003799 | 5/1986 | Fed. Rep. of Germany . | |
| 0077170 | 5/1893 | Japan | 123/145 A |
| 2216952 | 10/1989 | United Kingdom . | |

*Primary Examiner*—Willis R. Wolfe
*Attorney, Agent, or Firm*—Fitch, Even, Tabin & Flannery

[57] ABSTRACT

A rapidly heated glow plug which concentrates its heat at the tip of the protective sheath of the plug so that the tip is the first part to heat to the ignition temperature. The plug is heated by a coil of positive temperature coefficient resistance material such as nickel, and the method of manufacturing the plug results in there being a mass of PTC material at the tip of the protective sheath, with the coil being connected to this mass. The preferred mass is formed by melting several coils of wire within a hole formed in the tip of the sheath to close the hole and expose a large surface area of positive temperature coefficient resistance material at the very tip of the sheath to be heated first.

12 Claims, 2 Drawing Sheets

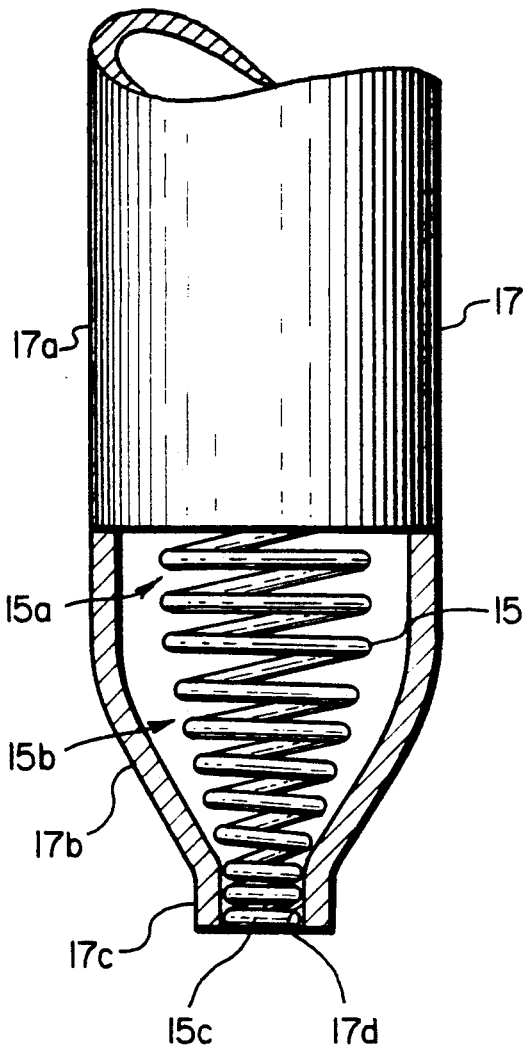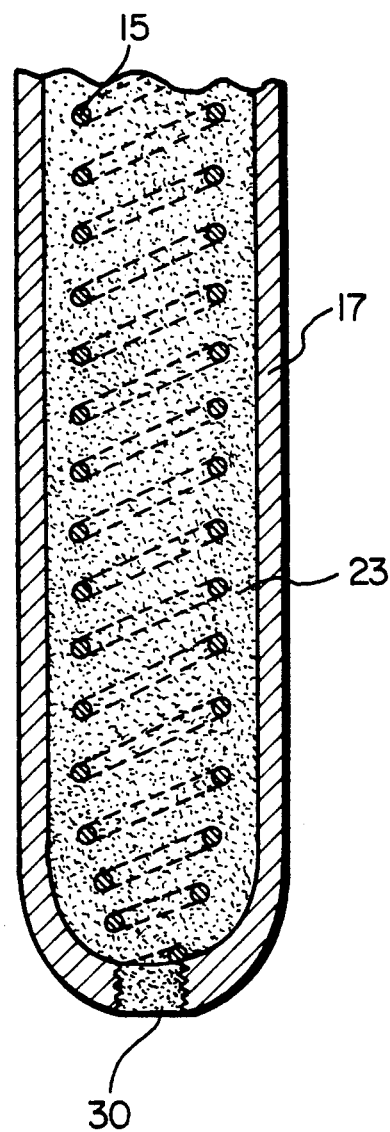

FIG. 3
FIG. 4
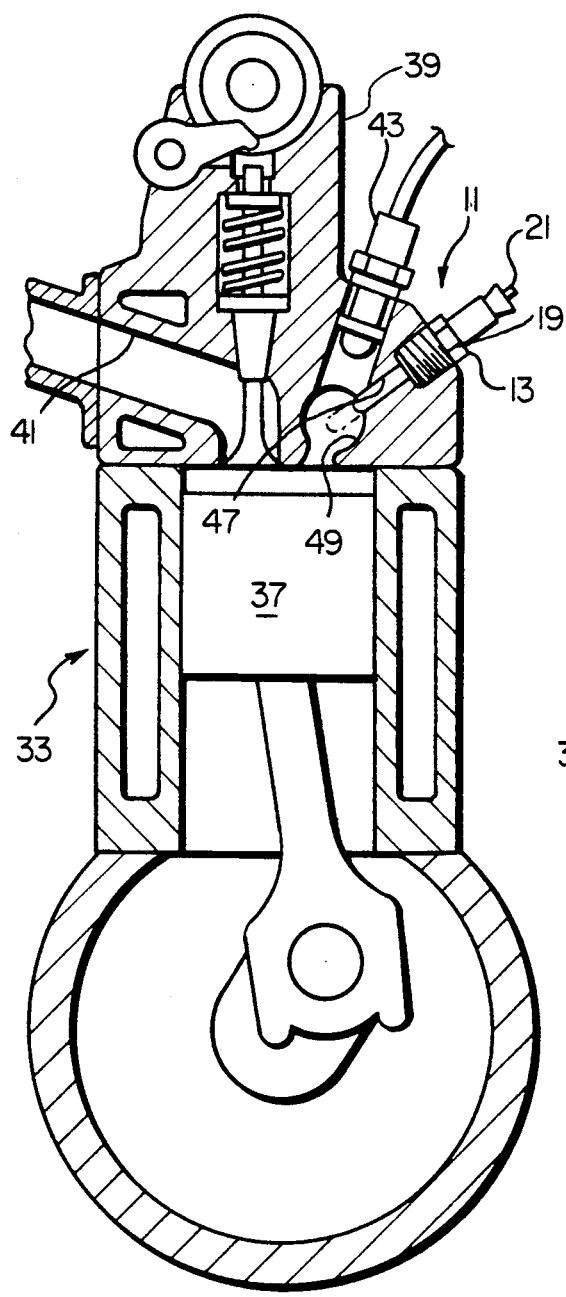
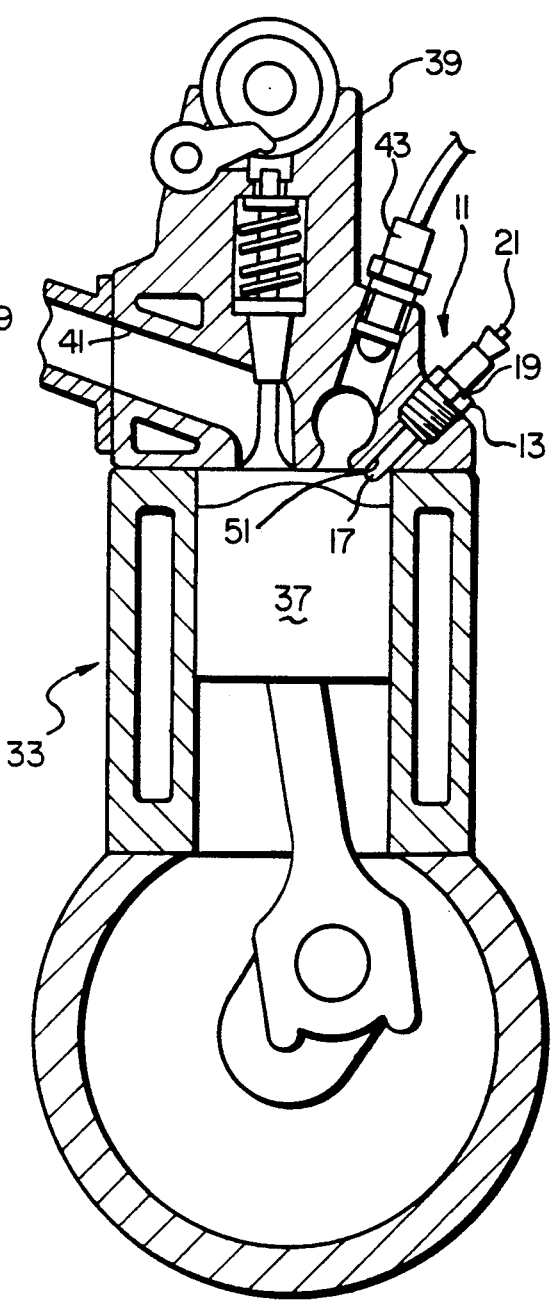

HOT TIP GLOW PLUG AND METHOD FOR MAKING

BACKGROUND OF THE INVENTION

This invention relates generally to fuel ignition devices used in internal combustion engines and more specifically to glow plugs used in diesel engines to ignite the air fuel mixture and a method for making such glow plugs.

The present invention relates to glow plugs of the type used in diesel engines for vehicles for igniting the air fuel mixture quickly. One of the major objections to the use of diesel engines in automotive applications has been the delay in starting the engines, which has resulted from the time required to heat the glow plugs to the starting temperature. As a consequence, there has been a continuing attempt by designers and manufacturers to reduce the time required to heat the glow plug to incandescence or the ignition temperature which is on the order of 1000° C.

The typical glow plug includes a protective sheath which is closed at the outer end and sealed at its inner end to a support portion which is threadedly received in an opening in the cylinder head of the engine, to mount the sheath in a location in the engine cylinder to ignite the air-fuel mixture. The sheath may be heated by a coiled resistance heater supported coaxially within the sheath by compacted magnesium oxide, which electrically insulates the coiled heater from the sheath. The outer end of the heater is connected to the tip of the sheath and the inner end is connected to an electrical terminal, which is insulated from the support portion. The terminal and the sheath are connected to a twelve volt DC supply voltage to supply current to heat the coiled heater element.

In an effort to decrease the time to heat the glow plug to the ignition temperature, many alternative variations have been made in the basic elements described above. The high temperatures and pressures of 1100° C. and 400 psi within the engine cylinder have limited the flexibility in design approaches that might be taken. In addition, the combustion gases within the engine cylinders tend to be very corrosive. The metallic sheath has a tendency to decrease the effectiveness of the heater in attaining the ignition temperature, since it presents a significant mass or heat sink to be raised in temperature by the heater. However, the hostile nature of the environment within the engine cylinder has necessitated the continued use of the protective sheath. Attempts made at providing glow plugs with exposed heating elements, unprotected by a sheath have been unsuccessful due to the short life of the heating elements. The sheath is typically formed of a high temperature, corrosive resistant alloy such as a nickel, chromium, iron alloy sold under the trademark Inconel.

Alternative designs for the coiled heating element have been employed to reduce heat-up times. Dual elements having one resistance heater portion and a control portion made of a material having a positive temperature coefficient of resistance have been used in glow plugs distributed commercially and disclosed in issued patents. Examples of patents directed to dual element glow plugs are Bauer U.S. Pat. No. 4,556,781; Murphy et al. U.S. Pat. No. 4,423,309 and Glauner et al. U.S. Pat. No. 4,211,204. The control resistance portions are typically made of nickel or some other material which increases in resistance by a factor of 4 or 5 when heated from room temperature to a temperature of 1000° C. Such control resistance permits the glow plug to be designed to provide a very high initial current which is decreased as the glow plug reaches ignition temperature so as to prevent damage from the sustained high current level. In these dual element plugs, the heater resistance was typically at the outer end of the sheath and the control resistance was toward the inner or mounting end of the sheath.

Other approaches involved concentrating the heating element toward the end of the sheath to minimize the heat loses and increase the effectiveness of the heating element. The patent to Testerini U.S. Pat. No. 3,158,787 is an example of a glow plug having such a heating element concentrated toward the tip of the sheath. The various approaches described above and others have been partially successful in lowering heat-up times for glow plugs, but the times are still generally in excess of ten seconds. One of the problems with existing commercially available glow plugs is that they start to glow or reach incandescence toward the middle of the sheath and not at the outer end. This condition is undesirable from two standpoints.

First, when the concentration of heat is between the ends of the sheath, the plug usually must have the total length of the sheath heated before the ignition temperature is achieved. Since the plug mounting conducts heat away or is a heat sink, the amount of heat required to reach ignition is greater, requiring a longer time. It would be preferable to heat the tip of the glow plug to incandescence first, to minimize heat loss and shorten the heat-up time.

The second problem associated with the failure to heat the tip of the glow plug relates to the present trend toward eliminating precombustion chambers for mixing air and fuel, and the trend toward direct injection in which the fuel is injected into a restricted space between the face of the piston and the adjacent wall of the cylinder head. It has been common in the past to have diesel engines formed with separate chambers into which the fuel was injected, mixed with air, and ignited. The glow plug for igniting the air-fuel mixture would often extend an inch or more into this chamber. Many current engines are designed with reduced size fuel mixing chambers or with the fuel injected directly into the area at the face of the piston.

These new designs leave much less space for the location of the glow plug. It is important to maintain the glow plug separated enough from the fuel injector so that the fuel is not sprayed directly on the sheath, since that tends to lengthen the heat-up time for the glow plug. As a consequence of the limited spaced available for mounting the glow plug, the current size of the plugs, and the fact that heat-up begins at the midpoint of the sheath rather than at the tip, renders the current glow plugs less than satisfactory. It would be preferable to have a shorter sheath in the glow plug and have the heat-up occur first at the tip rather than at the midpoint. With such conditions, less length of the sheath would be required to extend into the combustion area and the effective ignition part of the glow plug could be positioned in the optimum location to ignite the air-fuel mixture.

Various approaches have been followed in connecting the coiled heating element to the tip of the sheath to complete the heating circuit for the glow plug. U.S. Pat. No. 4,477,717 to Walton shows the axially extending end of the heating element extending through an opening in the end of the sheath when it is attached. The Mann U.S. Pat. No. 4,281,451 discloses the use of sintered metal to connect the element and the sheath. The German Patent No. DE 3,003,799 discloses a coiled heating element that is welded through an opening in the sheath to connect the element and sheath and seal the tip of the sheath. The German patent is directed to a dual element glow tube and at the outer end of the heating element where it is welded to the sheath, a number of the heater coils are engaged to short them out and reduce the heating effect in the outermost coils of the heating element.

SUMMARY OF THE INVENTION

The glow plug of the present invention is constructed so that under normal operating conditions the outermost end or tip is heated to the ignition temperature or to incandescence in between 3 and 5 seconds. The tip is heated prior to heating the portions of the plug sheath inwardly of the tip, thereby utilizing the applied power most efficiently by heating the portion of the sheath most useful for fuel ignition and by not wasting energy and time in heating the portions of the plug sheath spaced inwardly from the tip.

The glow plug is provided with a protective sheath formed of a material that is resistant to high temperatures and the corrosive gases present in a diesel engine. Mounted within the sheath is a helically wound heating element formed of a material having a positive temperature coefficient of resistance. The sheath is tapered at the outer end, having an axially disposed opening which receives the end turns of the heating element prior to attachment to the sheath. The outer end of the heating element is secured to the tapered end of the sheath by a welding process in which the end turns of the heating element are melted in an inert atmosphere to close the opening in the sheath by providing a core or cylindrical mass of metal from the outermost turns of the heating element. This core or mass seals the end of the sheath and also joins the heating element to the sheath.

Prior to assembly in the sheath, the coils of the heating element are of constant diameter from the inner end out to adjacent the outer end, where the coils decrease in diameter to the constant diameter end turns which are melted during the assembly process. The decreasing diameter of the coils adjacent the outer end create a tapered shape which generally matches the taper at the outer end of the sheath. After welding the heating element end to the sheath, the tapered configuration of the coil inside of a somewhat hemispherically shaped tip of the sheath provides increased heat to the tip because of closer spacing of adjacent coils of the heating element and the close proximity of the tapered turns to the wall of the sheath. The heating element is supported in the sheath by a suitable material such as compacted magnesium oxide which electrically insulates the heating element from the sheath and provides a heat conducting path between the heating element and the sheath.

The core or mass of nickel at the tip of the sheath is part of the series circuit including the nickel heating element and the protective sheath. The positive temperature coefficient (PTC) characteristic of the heating element and core causes the initial current flow to be very high, since the protective sheath is a low resistance element in the circuit and contributes little to restricting the value of the current. This current through the tip core delivers Joule heating to the tip of the sheath, where it tends to be much more effective than heating the sidewall of the sheath by conduction through the magnesium oxide outwardly from the heating element. The tapered turns of the heating element are more closely spaced to each other and are close to the wall of the hemispherical tip, thus concentrating the heating at the tip of the sheath rather than at the sidewalls.

In prior art glow plugs that commenced glowing in the middle of the protective sheath intermediate the tip and the support in the engine, the heat tended to drain in both directions away from the middle. This condition resulted in more time being required to heat the sheath to the ignition temperature. By concentrating the heat at the tip of the sheath, the available heat is used more effectively and ignition temperature is achieved sooner.

Accordingly, it is an object of the present invention to provide an improved glow plug which heats the outer tip to the fuel ignition temperature prior to heating the inner portions of the protective sheath to such ignition temperature.

It is a further object of the present invention to provide an improved glow plug which heats the outer tip of the protective sheath to the ignition temperature in less than five seconds.

It is another object of the present invention to provide a method of making a hot tip glow plug using a PTC heating element which is welded to the protective sheath to provide a PTC mass at the tip which joins a coiled heating element to the protective sheath.

BRIEF DESCRIPTION OF THE DRAWINGS

These and other objects of the invention will become apparent from the following detailed description taken in conjunction with the accompanying drawings in which:

FIG. 1 is a side view partially in cross-section of a glow plug of the present invention at an intermediate stage of construction prior to welding the heating element to the protective sheath;

FIG. 2 is a cross-sectional view of a glow plug constructed in accordance with the present invention;

FIG. 3 is a cross-sectional view of a cylinder of a diesel engine showing the mounting of the glow plug of the present invention; and FIG. 4 is a cross-sectional view similar to FIG. 3 but illustrating an alternative mounting of the glow plug directly in the engine cylinder adjacent to the face of the piston.

DETAILED DESCRIPTION OF THE PREFERRED EMBODIMENT

Illustrated in FIGS. 1 and 2 of the drawings is the end portion of a glow plug which extends into an engine to ignite an air-fuel mixture. Shown in FIGS. 3 and 4 are various engine configurations in which a glow plug 11 embodying the present invention may be mounted. The glow plug 11 includes a housing 13 for an electric heating element 15 which is shown in FIG. 2.

The housing 13 is formed by a tubular protective sheath 17 and an outer casing 19 which includes a threaded portion which is adapted to secure the glow plug 11 in the cylinder head wall with the sheath 17 extending into the interior of the engine. Extending from the outer casing 19 is a terminal 21 which serves to connect the glow plug to a battery to supply power to the heating element 15. The construction of the outer casing 19 and the manner in which the housing 13 is sealed may be in accordance with the disclosure of U.S.

Pat. No. 4,477,717 to Walton, which is included herein by reference.

As in the typical glow plug, the circuit for energizing the plug includes the terminal 21, the heating element 15, the sheath 17 and the outer casing 19. The terminal 21 is electrically insulated from the outer casing 19 and extends through the outer casing 19 to connect to the inner end of the heating element 15. The heating element 15 is wound in a helical shape with loops of decreasing diameter, to form a tapered configuration at the outer end where the element is connected to the sheath 17.

In order to insulate the heating element 15 from the side walls of the sheath 17 and to provide heat conduction to the sheath, compacted magnesium oxide 23 is employed within the sheath 17 and surrounding the turns of the heating element 15. To assure good compaction of the magnesium oxide, the sheath 17 is rolled or swaged to decrease its diameter and further compact the magnesium oxide. The heat conduction through the magnesium oxide is necessary to not only heat the sheath 17 but also to prevent burnout of the heating element 15 as a result of the high currents carried therein.

The sheath 17 is formed of a high temperature corrosion resistant alloy or type of stainless steel. The purpose of the sheath 17 is to protect the heating element 15 from the high temperatures, high pressures and corrosive gases present within the cylinders of a diesel engine. However, the delay in elevating the glow plug to fuel ignition temperature is largely attributable to the sheath and the supporting deposit of magnesium oxide. Although these materials, sheath 17 and the layer 23 are designed to be as heat conductive as possible, they still comprise a heat sink that must be brought up to temperature along with the heating element 15. It is largely because of this heat sink effect that it has been difficult to reduce the heat-up time as much as desired to rival the spark ignition engine.

At the present time, all commercially available glow plugs heat the protective sheath in such a manner that the sheath first becomes red or incandescent in an area spaced inwardly from the tip, rather than at the tip. The heat thereafter moves in both directions along the sheath, causing it to glow along its entire length. The significance of this glow progression is that it indicates that most of the sheath and contents are brought up to temperature before the tip of the plug. The heating of this entire mass of the sheath and its contents obviously delays the ignition of the air-fuel mixture. In contrast, the glow plug of the present invention glows first at the very tip before causing the rest of the sheath to reach incandescence. This shortens the start-up time and lessens the heat lost to the adjacent engine parts. Another advantage from the tip heating is that less of the sheath need extend out into the area within the engine where the air and fuel are mixed. This aspect becomes even more important as more diesel engines are designed with direct injection with the objective of having the glow plug between the piston and cylinder head and not in a precombustion chamber. Since the temperature of a glow plug can be lowered considerably if subject to fuel spray, the need for less projection of the sheath portion into the combustion area of the engine makes it easier to locate the glow plug out of the fuel spray.

In order to describe the interconnection between the heating element 15 and the sheath 17, reference will be made to the novel method in which these parts are assembled. As shown in FIG. 1, the sheath 17 initially comprises a cylindrical tube 17a which is open at its inner end (not shown) and is formed with a converging or conical wall 17b terminating in a constant diameter flange 17c which defines a passageway 17d. The heating element 15 is shown as having a helical shape with a portion 15a having a plurality of constant diameter turns connected to a portion 15b having turns of decreasing diameter and more closely spaced turns. At the outer end of the heating element 15, there is provided a portion 15c having a plurality of constant diameter turns which are in contact with each other within the sheath passageway 17d.

In the method of the present invention, the heating element 15 is connected to the sheath by welding with an inert atmosphere. The element 15 is formed of a material having a positive temperature coefficient of resistance. A preferred material is nickel, which increases in resistance between room temperature and 1000° C. by a factor of between 5 and 6. In welding the element 15 to the sheath 17, the inert atmosphere used to prevent oxidation may enter the sheath 17 through the opening 17d, to completely envelop the area of the weld. The portion 15c of the element 15 is melted in the welding process along with a portion 17c of the sheath 17. As a result of the welding process, there is created a core or mass 30 at the tip of the sheath. The mass 30 is composed largely of nickel with a small amount of the sheath material at the edges of the mass 30. The mass 30 seals the end of the sheath 17 and provides a good electrical and heat conductive path between the element 15 and the sheath 17.

The mass 30 being made of PTC material, as is the heating element 15, may be considered to be part of the heating element. This arrangement effectively extends the heating element to the tip of the sheath and removes or substitutes for that portion of the sheath that had functioned as a heat sink at the tip of the sheath. The heating of the tip of the sheath is further enhanced by the fact that the tapered coils 15b of the heating element 15 are more closely or densely arranged, and are positioned closer to the hemispherical tip of the sheath than are the coils in the portion 15a positioned with respect to the cylindrical sidewall 17a. This use of the mass 30 and the arrangement of the coils 15b with respect to the hemispherical tip wall causes the tip to become a net contributor to the heating process as compared to being a heat sink in the prior art glow plug configurations. As a consequence, the tip of the sheath reaches the desired ignition temperature more rapidly than the prior art and in as little as 3 seconds in constructed embodiments.

Although the showing of FIG. 2 has been described in connection with the configuration of the sheath 17 and heating element 15 after welding, it should be understood that the magnesium oxide 23 is not introduced into the sheath 17 until after welding. After compacting the granular magnesium oxide, the sheath is rolled and/or swaged to reduce the diameter of the sheath, to further compact the magnesium oxide. This process, which is commonly used in the fabrication of sheathed heaters in general and glow plugs in particular, causes the sheath 17 to elongate at the time it is reduced in diameter. This elongation results in the turns of the heating element 15 being extended so that there is a greater space between adjacent turns as may be noted from comparing FIGS. 1 and 2. However, there is little elongation in the area of the tip, with the result that the turns of the portion 15b are more closely spaced to each other and remain closely spaced with respect to the hemispherical tip wall.

In order to consider the advantages of the hot tip glow plug of the present invention with respect to the mounting in an engine, reference is made to the alternative mounting arrangements shown in FIGS. 3 and 4. Each of these figures shows an engine 33 having an engine block 35, piston 37 and a cylinder head 39. Each cylinder head 39 includes an exhaust port 41, a fuel injector 43 and a valve 45.

In the engine of FIG. 3, the glow plug 11 is mounted in the cylinder head 39 in a passageway 47, with the sheath 17 projecting into a chamber 49 into which fuel is sprayed by the injector 43. The chamber 49 is restricted in volume, leaving little space into which the glow plug may extend. In the configuration of the present invention, the glow plug 11 may be mounted in the passageway 47, with only the tip projecting into the chamber 49. This limited projection allows the glow plug to be located so that it is out of the direct fuel spray from the injector 43, while still having the hot tip in position to ignite the air-fuel mixture. On the other hand, the prior art glow plugs having maximum heating midway between the ends of the sheath must be mounted extending well into the chamber 49, as shown by the dashed line showing of a sheath in FIG. 3. If the prior art glow plugs are mounted in a recessed position as shown by plug 11 in FIG. 3, there would be substantial heat loss to the cylinder head before the tip would reach ignition temperature. This condition would lengthen considerably the start-up time.

Referring to FIG. 4, there is shown a preferred engine configuration in which the glow plug is located extending directly into the engine cylinder in the area immediately above the piston. One of the problems existing heretofore has been the space limitations in this area with the face of the piston often moving to within half an inch of the cylinder head wall. The hot tip glow plug of the present invention requires a minimum projection into the space in which the fuel is to be ignited. Accordingly, the plug 11 in the embodiment of FIG. 4 is mounted in a passageway 51 extending through the cylinder head well into the area of the cylinder above the piston 37, with only the tip of the sheath extending beyond the cylinder head wall. With the hot tip glow plug 11, the tip of the sheath heats to ignition temperature in 3 to 5 seconds with a minimum heat loss to the wall defining the passageway 51. The plug 21 thus provides great flexibility in where the ignition means may be located within the combustion space, no longer being constrained by having to provide space for a sheath of an inch or so in length. Instead, a quarter of an inch or less of the sheath tip is all that need extend into the combination chamber.

From the foregoing it will be seen that a high-purity PTC resistance metal core from the coil is connected inside of the sheath to the low resistance return conductor outside of the sheath. This core adds an $i^2r$ at the precise point most desired, i.e., the very end of the heater tip. Further, this now makes the metal mass a net contributor to the heating process. Combined with the heat that is transferred along the enclosed fine metal PTC wire, the lower mass of the tip (as compared to the much larger sheath aft) gives the tip a thermoelectric head start on the balance of the total heated surface of the sheath. Further, the conduction path from coil to sheath through MgO is shorter at the tapered or radiused tip, which with the reduced heat sink effect further contributes to timely raising the tip of the heater first in the cycle of heating the whole length of the sheath. By changing the tip of the glow plug to have a PTC metal core (such as pure nickel) connecting the internal coil to the external surface of the sheath and maintaining close proximity of coil-to-coil spacing of the internal coil near the tip, the thermal electric characteristics of the tip portion of the sheath are modified. This improvement causes the tip to become a net contributor to the heating process versus a heat sink in prior art and results in the tip very rapidly reaching the desired glow plug temperature. Also beneficial tip heating physics occur in this instance. The smaller mass of the tip versus the rest of the sheath and the shorter conductive path through packed MgO at the tip enhance the rapid heat-up of the cored tip during the early portion of the heat-up cycle.

The novel glow plug provides a substantial improvement in reducing the time to heat up to the required ignition temperature. The configuration which makes possible this improvement in reducing start-up times has the additional advantage of reducing the size of the operative portion of the glow plug that must be positioned within a combustion area to ignite a fuel mixture The heating of the tip of the sheath to ignition temperatures prior to the inner portions of the sheath provides these improved results.

While a preferred embodiment of the invention has been shown and described, it will be understood that there is no intent to limit the invention by such disclosure, but rather it is intended to cover all modifications and alternative constructions falling within the spirit and scope of the invention as defined in the appended claims.

What is claimed is:

1. A hot tip glow plug for use in a direct injection engine having fuel ignition means, comprising
    a housing for mounting in an engine cylinder head wall,
    a sheath mounted in the housing, said sheath being formed of high heat strength alloy and having an opening in the outer end thereof,
    an electrical heating element in said sheath formed of a wire material having a positive temperature coefficient of resistance and connected to said sheath, said element being helical in shape with the adjacent coils of said helical element being spaced from each other,
    a compacted body of electrically insulating heat conducting material supporting said heating element in spaced relation to said tubular metal sheath, and
    a core formed of several coils of melted wire material filling the opening in the sheath and forming a core of positive coefficient of resistance material at the outer end of the sheath with said core heating said tip of said sheath to incandescence prior to said portions of said sheath inward of said tip.

2. A hot tip glow plug in accordance with claim 1 wherein said core has a substantially greater surface area than the cross-sectional area of the wire in said element whereby said core accelerates the heating of said tip by the outer end of said element.

3. A hot tip glow plug in accordance with claim 2 wherein said positive temperature coefficient material is nickel and said end wall of said sheath is hemispherical in shape.

4. A hot tip glow plug in accordance with claim 3 wherein said heating element is formed with a tapered section having spaced turns of gradually decreasing diameter within the hemispherical volume enclosed by said tip so that the turns are closely spaced with respect to the walls of said tip to provide good heat transfer to said tip, said heating element and turns in said tip being spaced axially closer to each adjacent turn than the heating element turns disposed inwardly of said tip.

5. In combination with a direct injection engine having fuel ignition means mounted in a cylinder head space between the cylinder head and the exposed face of a piston mounted for reciprocation therein, the improvement comprising a cylinder head formed with a plug mounting passageway extending through said cylinder head to said space between said cylinder head and the face of a piston, a glow plug mounted in said passageway and extending less than 0.50 inch into said space, said plug including a heat resistant sheath having a cylindrical sidewall and enclosing a helically wound element of positive temperature resistance material supported in spaced relationship to said sheath sidewall by a compacted heat conducting electrically insulating material, said sheath having an opening therein, a core in the tip of the sheath closing the opening and providing a large mass of positive temperature coefficient material to which said element is connected, said element and core thereby heating the tip of said sheath to incandescence before the cylindrical sidewalls of said sheath.

6. The combination of claim 5 wherein said helically wound element is formed by connected loops of wire each of which is spaced from the adjacent loops of wire, said core having a surface area which is substantially greater than the cross-sectional area of said wire, said core heating said tip to incandescence in less than 5 seconds.

7. The combination of claim 5 wherein said heating element and said core are formed of nickel, the core being formed by melting a plurality of closely adjacent, smallest diameter turns of said heating element in the opening in an end wall of said sheath.

8. The combination of claim 7 wherein said sheath includes a hemispherical end wall connected to said cylindrical sidewall, said core being disposed in said end wall on the axis of said sheath, said heating element having within said end wall spaced turns of gradually decreasing diameter terminating at the connection with said tip portion, said turns within said end wall forming the core being closely spaced with respect to said sheath.

9. The combination of claim 8 wherein said heating element is formed with spaced turns of uniform diameter within said cylindrical sidewall, said turns within said cylindrical sidewall being at a greater spacing than the turns in said end wall.

10. A method of forming a hot tip glow plug comprising providing an elongated tubular sheath having a cylindrical sidewall and being open at one end and having a tapered end wall at the other end, said end wall being formed with a hole which is coaxial with the axis of said cylindrical sidewall, inserting into said sheath a helical heating element which includes a plurality of spaced turns of uniform diameter connected to a tapered section having spaced turns of gradually decreasing diameter terminating at a plurality of reduced diameter end turns each of which is engaged with an adjacent turn, said reduced diameter end turns extending into said hole in said end wall, welding said reduced diameter end turns to said end wall by melting said end turns and the adjacent portion of said end wall in an inert gas atmosphere to form a plug closing said hole in said end wall with said spaced turns of gradually decreasing diameter being connected directly to said plug.

11. The method of forming a hot tip glow plug in accordance with claim 10 including the further steps of inserting and compacting within said sheath a granular heat conducting electrical insulating material to support said helical heating element in spaced relation to said cylindrical sidewall of said sheath, forming said sheath to reduce the diameter of said sheath to compact said granular material.

12. The method of forming a hot tip glow plug in accordance with claim 10 wherein said end wall of said sheath is formed with a cylindrical portion defining said hole, said cylindrical portion being melted with said end turns to provide a mixture of material from said sheath and from said end turns to form said plug.

* * * * *